Figure 1:
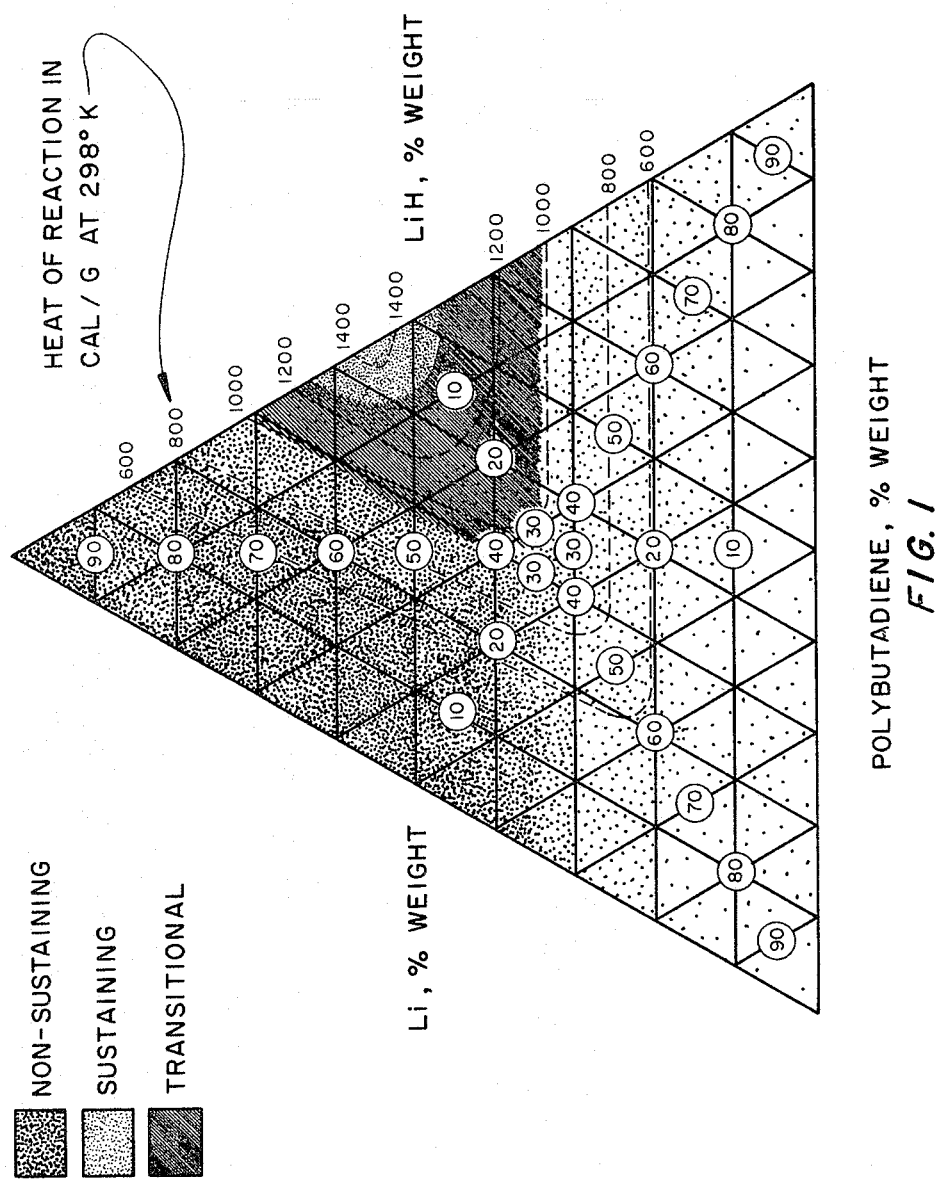

3,304,213
HIGH REGRESSION RATE PROPELLANT CONTAINING LITHIUM, LITHIUM HYDRIDE, AND POLYBUTADIENE

Peter L. Stang, San Jose, Calif., assignor to United Aircraft Corporation, East Hartford, Conn., a corporation of Delaware
Filed Apr. 3, 1963, Ser. No. 270,322
12 Claims. (Cl. 149—19)

This invention relates to high-regression-rate, energetic propellant, and, more particularly, to a fuel comprised of a hydrocarbon and lithium and to the methods for its preparation.

The present invention is directed to a composition for a solid grain having high-regression-rate characteristics making it uniquely suitable for use in hybrid, reaction-motor systems. In addition, the preferred composition incorporates components which impart high specific impulse characteristics to the system. In a typical hybrid motor the solid grain is provided with a longitudinal perforation; upon injection of a reactive liquid into the grain perforation combustion ensues and high temperature gases are produced for propulsion. In the past, however, considerable difficulty has been encountered in achieving a satisfactory fuel delivery rate from the grain to the liquid oxidizer. It is recognized in the art that this delivery rate or, more appropriately, the regression-rate of the grain, is highly dependent upon the transfer of energy from the reaction products in the core of the grain to the surface of the grain. Consequently, to improve regression rates, efforts have been made in the past to increase the temperature of the gases within the core, but these efforts have been only partially successful.

The present invention, however, employs a technique which makes regression rates substantially non-dependent upon flame temperature. Basically, this process calls for a propellant grain comprised of constituents which, after appropriate initiation, inter-react exothermically in a substantially self-sustaining manner to produce reaction products and/or grain particles that will readily react with the liquid phase. For example, in a fuel grain the reaction products produced by the internal exothermic reaction will be fuels in and of themselves suitable for reaction with the liquid oxidizer.

In addition, it is also well known that the heats of oxidation of certain light metals such as magnesium, aluminum, lithium, and their various compounds are of such magnitude per unit weight that these materials are preferred fuel constituents where increased performance is desired. In particular, lithium metal has long been considered a highly desirable fuel because of its relatively high specific impulse with many oxidizers. However, metallic lithium grains are not feasible because lithium metal possesses high thermal-conductivity and a low melting point; consequently, upon heating a substantial portion will prematurely melt and pass through the nozzle orifice without burning. The preferred compositions of the present invention are, none-the-less, capable of containing substantial quantities of lithium because of the unique compatibility of the components.

It is, therefore, an object of this invention to provide a high energy solid propellant which possesses regression rates substantially greater than those of prior art hybrid solid-propellants.

In addition, it is a further object to provide a solid propellant composition comprised of constituents which react in a substantially exothermic manner to produce combustion products which are excellent fuels.

It is a further object to provide a solid hybrid propellant fuel which does not rely solely upon heat transfer from the hot working-fluid to place the fuel constituents of the fuel grain into the combustion chamber for reaction with the oxidizer of the hybrid system.

It is another object to provide a high energy solid propellant fuel which incorporates substantial quantities of metallic lithium to effect increased performance.

It is an additional object to provide a solid hybrid fuel which possesses excellent physical properties, is insensible to impact, and is easily formulated.

Other and further objects and advantages of this invention will be apparent to one skilled in the art upon study of the disclosure of the invention including the appended drawings wherein:

FIG. 1 is a ternary composition diagram showing the heat of reaction of the various possible combinations of lithium, polybutadiene, and lithium hydride.

Figure 2:
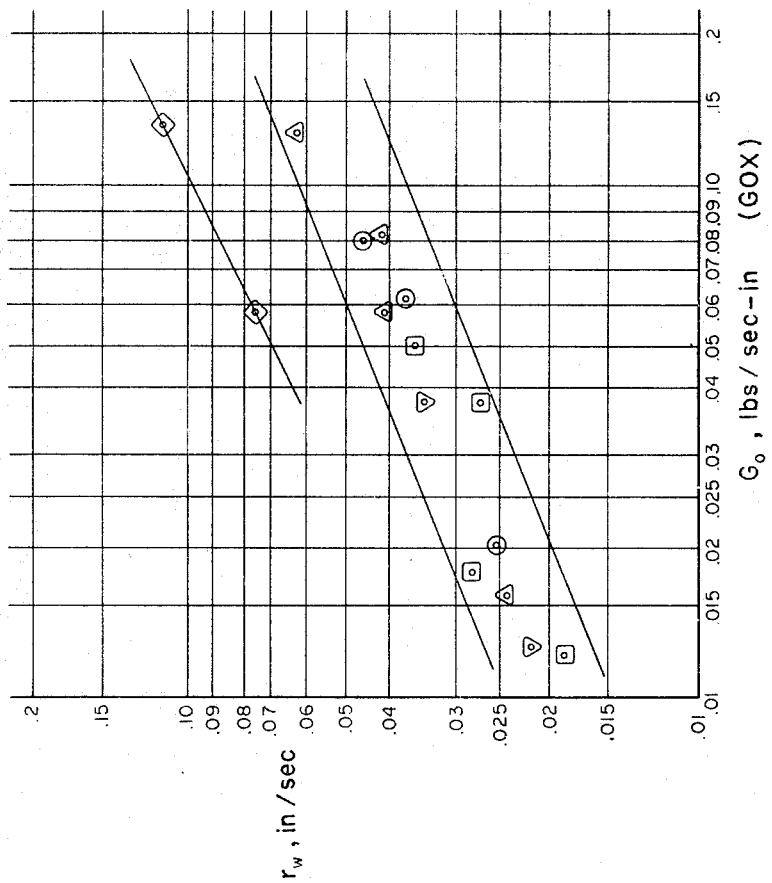

FIG. 2 graphically illustrates the regression rates for several preferred fuel compositions burned with gaseous oxygen.

The present invention calls for mixing lithium with a binder such as liquid polybutadiene or polyisoprene whereupon curing at room or slightly elevated temperatures produces a high-energy, solid-fuel grain possessing a regression rate many times greater than that of more conventional hybrid fuels. Lithium may be mixed with the liquid polymer in a wide variety of proportions and, in fact, the lithium may constitute the major constituent of the mixture. Upon ignition, the lithium and polymer, such polybutadiene, react in an exothermic manner to eject from the burning surface of the grain combustion products which are excellent fuels in accordance with the following equations:

(1) $10n(\text{Li}) + (\text{C}_4\text{H}_6)_n \rightarrow 2n(\text{Li}_2\text{C}_2) + 6n(\text{LiH}) + \text{Heat}$
(2) $\text{Li} + \text{Excess }(\text{C}_4\text{H}_6)_n \rightarrow \text{Li}_2\text{C}_2 + \text{LiH} + \text{H}_2 + \text{Heat}$
(3) $3\text{Li} + \text{LiAlH} + \frac{1}{2}(\text{C}_4\text{H}_6)_n \rightarrow n(\text{Li}_2\text{C}_2) + 2n(\text{LiH}) + \text{Al} + 5/2\text{H}_2 + \text{Heat}$ The heat from the above reactions supplement or wholly replace the convective and conductive heat transfer from the flame normally relied upon to promote grain-burning, and results in a regression rate above 0.10 inch per second at oxidizer mass fluxes of 0.10 lb./sec.-in.$^2$.

This initial reaction between the lithium and polybutadiene accounts for approximately 10 percent of the total potential specific impulse. The combustion products, as can be seen from the above equations, are hydrogen, lithium hydride, and lithium carbide, all of which are excellent fuels and, upon oxidation, provide the bulk of the impulse.

It has been found, for example, that a composition containing approximately 50 percent by weight of lithium and 50 percent by weight of polybutadiene will react exothermically to provide a self-sustaining reaction in the complete absence of an oxidizer. Consequently, the regression rate can be made wholly independent of the convection and conductive heat transfer characteristic of the flame which normally places the grain in condition for consumption with an oxidizer.

However, in many instances it is desirable to have on-off capability in a hybrid engine requiring, therefore, that the self-sustaining characteristics be tempered to a point where the exothermic reaction between the lithium and polybutadiene will not occur unless part of the heat for sustaining the reaction is provided by the conventional heat transfer from the flame. It has been found that a number of lithium compounds are suitable diluents for this purpose. For example, by replacing a portion of the lithium with lithium hydride, the heat of reaction between the three constituents which now make up the fuel grain will be such that a self-sustained reaction is no longer possible. In order for the reaction to continue, oxidizer must be injected into the grain perforation providing, therefore, control of the grain burning rate.

This unique on-off capability has been found, for example, with compositions consisting of approximately 50 percent by weight of polybutadiene, 25 percent by weight of lithium, and 25 percent by weight of lithium hydride. With this mixture the fuel-phase, exothermic reaction between the polybutadiene, lithium, and lithium hydride is non-self-sustaining while at the same time high performance levels and high regression rates are still achieved. Obviously, a large number of combinations of lithium, lithium hydride, and polybutadiene may be produced which will result in either sustaining or non-sustaining reactions to conform with the specific requirements of the particular mission as will be pointed out in more detail hereinbelow.

In order to show more clearly the composition ranges which will produce either self-sustaining or non-self-sustaining reactions, a ternary diagram of Li-LiH and polybutadiene is represented by FIG. 1. From this ternary diagram, it can be seen that to effect a maximum tendency for sustained reaction the composition must be adapted to incorporate approximately 45 percent lithium and 55 percent polybutadiene. With this composition, the heat of reaction is in excess of 1,400 calories per gram at 298° Kelvin. By varying the quantities of lithium or polybutadiene, the heat of reaction is no longer self-sustaining and, consequently, the reaction within the grain will cease when the liquid oxidizer is cut off. From this ternary diagram it is readily apparent that by the addition of lithium hydride to form a ternary composition the heat of reaction may be reduced to a point where it is no longer self-sustaining. For example, a formulation of 25 percent lithium, 25 percent lithium hydride and 50 percent polybutadiene falls into the zone on the ternary diagram depicting compositions incapable of self-sustained reactions an effect brought about by the dilution medium, lithium hydride. Although lithium hydride is used in this instance as a diluent, many materials may be used in place of the LiH to avoid the self-sustained exothermic reaction between Li and polybutadiene.

In FIG. 2 the difference between the non-self-sustaining composition and the self-sustaining composition of 50 percent lithium and 50 percent butadiene is clearly shown. To achieve regression rates intermediate to these two regions, compositions falling in the transition zone of FIG. 1 should be used.

Below is a table setting forth examples of mixture formulations which are typical preferred compositions of the present invention.

oxygen as the oxidizer, similar results are produced by using liquid oxygen or other storable liquid oxidizers.

It is obvious that one may substitute or withdraw certain ingredients from the above described examples without effecting the identity of the compositions since many such alterations may be made without introducing an action incompatible with the over all purpose of the present invention. This is because the combination of lithium and polybutadiene, or other polydiolefin, in a fuel grain formulation confers characteristics to said fuel which are separable from those imparted by other ingredients which may be added to impart certain characteristics obviously inherent to said ingredient.

In the preparation of such preferred compositions, it is obvious that some care must be exercised since lithium and lithium hydride react with atmospheric moisture. Consequently, it is preferable to weigh, add, mix, and cast the materials under an argon of other inert atmosphere. It has been found that the dew point of commercial argon is satisfactory since the lithium will act as a getter for the remaining water to form an inert filler in the solid fuel grain.

*Example 1*

A preferred non-self-sustaining composition consisting of 50 percent polybutadiene, 25 percent lithium, and 25 percent lithium hydride by weight may be prepared as follows: under an atmosphere of argon, weigh out the lithium and lithium hydride, mix the two ingredients into an appropriate quantity of liquid polybutadiene and cast in the form desired. Although it is preferable to maintain an inert atmosphere at all steps, once the solids have been wetted by the polybutadiene, it is then relatively safe to handle in ambient atmosphere since only a negligible amount of oxidation appears to take place at the surface.

It has been found that lithium spheres of which approximately 90 percent are under 20 microns in diameter are suitable for the compositions herein described although larger diameter particles may be used. In the cases where the lithium is shipped in a mineral oil or other material, it will be necessary to filter the lithium in a dry box and wash with penthane. It has also been found that the liquid polybutadiene contains water in some cases which must be removed by conventional techniques such as azeotropic distillation. Polybutadiene suitable for this application should possess molecular weights up to 3,000 and exhibit a room temperature viscosity of approximately 300 poises. It has also been found that if the polybutadiene, or other polymers used in the practice of this invention, contains a small quantity of hydroxyl as a

| No. | Lithium, percent by weight | Diluent, percent by wt. | Liquid Polymer, percent by wt. | Cure Temperature (° C.) | Cure Temperature (hrs.) | Oxidizer, lbs./sec./in.$^2$ | Minimum Regression Rate, in./sec. |
|---|---|---|---|---|---|---|---|
| 1. | 30 | | 70 Polybutadiene | 60 | | | |
| 2. | 40 | | 60 Polybutadiene | 60 | 72 | 0.10 | 0.064 |
| 3. | 50 | | 50 Polybutadiene | 60 | 72 | 0.10 | 0.10 |
| 4. | 20 | 20 Lithium hydride | 60 Polybutadiene | 80 | 48 | 0.10 | 0.05 |
| 5. | 25 | 25 Lithium hydride | 50 Polybutadiene | 80 | 48 | 0.10 | 0.067 |
| 6. | 30 | | 70 Polyisoprene | 40 | 72 | 0.10 | 0.05 |
| 7. | 20 | 20 Lithium hydride | 60 Polyisoprene | 40 | 72 | 0.10 | 0.05 |
| 8. | | 50 Lithium hydride | 50 Polybutadiene | 40 | 72 | | |
| 9. | 25 | 25 Lithium aluminum hydride | 50 Polybutadiene | 40 | 72 | | |
| 10. | 14.38 | | 85.62 Polybutadiene | 40 | 72 | | |

In this table it can be seen, for example, that a 50–50 mixture of lithium and polybutadiene produces a regression rate in excess of 1/10 of an inch per second when burned with gaseous oxygen at a concentration of 0.1 pound per second per inch squared of port area. This rate of regression is substantially greater than heretofore achieved with conventional hybrid fuels and is the result of the rapid reaction of unique components as hereinabove described to produce a fuel phase highly suitable for consumption by the oxidizer. Although the regression rates in the above table result from the use of gaseous functional group on the polymer chain, such as indicated in the formula:

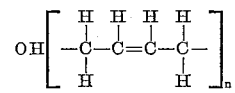

curing can be effected by maintaining the mixture at a temperature of 80° C. whereupon polymerization will result in approximately 48 hours without the addition of extraneous curing agents.

An interesting aspect of the present invention is that the lithium, which is uniformly mixed with the polybutadiene, actually acts to catalyze the polymerization of the polybutadiene and speed up the curing cycle.

*Example 2*

An example of a self-sustaining composition having a regression rate of 0.10 inch per second may be prepared by mixing 50 percent liquid polybutadiene having a molecular weight of approximately 3,000 and a room temperature viscosity of approximately 300 poises with 50 percent by weight of lithium spheres under an argon atmosphere. After the mixture is substantially homogeneous, pour into a suitable mold and cure for 72 hours at 60° C.

*Example 3*

An additional example of a non-self-sustaining composition may be produced by mixing 20 percent by weight of lithium, 20 percent by weight of lithium hydride, and 60 percent by weight of liquid polyisoprene under an argon atmosphere. Cast the resultant mixture into a grain having an axial perforation and cure for 72 hours at 40° C. A fuel grain results having a regression rate of approximately 0.05 inch per second upon reaction with gaseous oxygen flowing through the axial perforation at the rate of 0.10 pound per second per square inch of core cross-section.

Other ingredients, as pointed out above, can, of course, be added to either dilute the effect or to add another effect which is characteristic of the material added. Consequently, various modifications are contemplated and may obviously be resorted to by those skilled in the art without departing from the spirit and scope of the invention as hereinafter described by the appended claims, as only preferred embodiments thereof have been disclosed.

Having thus described the invention, what is claimed is:

1. An exothermic mixture consisting essentially of lithium and polybutadiene in the ratio by weight of one part lithium and from about 0.9 to 1.6 parts polybutadiene wherein up to about 8 percent by weight lithium hydride is substituted for said lithium and polybutadiene.

2. An exothermic mixture consisting essentially of lithium and polybutadiene in the ratio by weight of one part lithium and from about 0.5 to 2.3 parts polybutadiene with up to about 32 percent lithium hydride as a substitute for said lithium and polybutadiene.

3. An exothermic mixture consisting essentially of lithium and polybutadiene in the ratio by weight of one part lithium and from about 0.25 to 4 parts polybutadiene with up to about 50 percent lithium hydride as a substitute for said lithium and polybutadiene.

4. An oxidizer-free hybrid grain consisting essentially of lithium and polybutadiene in the ratio by weight of one part lithium and from about 0.9 to 1.6 parts polybutadiene wherein up to about 8 percent by weight lithium hydride is substituted for said lithium and polybutadiene.

5. An oxidizer-free hybrid grain consisting essentially of lithium and polybutadiene in the ratio by weight of one part lithium and from about 0.5 to 2.3 parts polybutadiene wherein up to about 32 percent by weight lithium hydride is substituted for said lithium and polybutadiene.

6. An oxidizer-free hybrid grain consisting essentially of lithium and polybutadiene in the ratio by weight of one part lithium and from about 0.25 to 4 parts polybutadiene wherein up to about 50 percent by weight lithium hydride is substituted for said lithium and polybutadiene.

7. An exothermic mixture consisting essentially of lithium and polybutadiene in the ratio by weight of one part lithium and from about 0.9 to 1.6 parts polybutadiene where up to about 8 percent by weight of an energetic material other than lithium is substituted for said lithium and polybutadiene.

8. An exothermic mixture consisting essentially of lithium and polybutadiene in the ratio by weight of one part lithium and from about 0.5 to 2.3 parts polybutadiene where up to about 32 percent by weight of an energetic material other than lithium is substituted for said lithium and polybutadiene.

9. An exothermic mixture consisting essentially of lithium and polybutadiene in the ratio by weight of one part lithium and from about 0.25 to 4 parts polybutadiene where up to about 50 percent by weight of an energetic material other than lithium is substituted for said lithium and polybutadiene.

10. An exothermic mixture consisting essentially of lithium and polybutadiene in the ratio by weight of one part lithium and from about 0.9 to 1.6 parts polybutadiene wherein up to about 8 percent by weight of a constituent selected from the group consisting of lithium hydride and lithium aluminum hydride are substituted for said lithium and polybutadiene.

11. An exothermic mixture consisting essentially of lithium and polybutadiene in the ratio by weight of one part lithium and from about 0.5 to 2.3 parts polybutadiene wherein up to about 32 percent by weight of a constituent selected from the group consisting of lithium hydride and lithium aluminum hydride are substituted for said lithium and polybutadiene.

12. An exothermic mixture consisting essentially of lithium and polybutadiene in the ratio by weight of one part lithium and from about 0.25 to 4 parts polybutadiene wherein up to about 50 percent by weight of a constituent selected from the group consisting of lithium hydride and lithium aluminum hydride are substituted for said lithium and polybutadiene.

References Cited by the Examiner

UNITED STATES PATENTS

| | | | |
|---|---|---|---|
| 2,926,613 | 3/1960 | Fox | 149—87 X |
| 3,017,748 | 1/1962 | Burnside | 60—35.6 |
| 3,053,709 | 9/1962 | Herty | 149—19 |
| 3,083,526 | 4/1963 | Hudson | 149—19 X |
| 3,084,084 | 4/1963 | D'Alelio | 149—19 |

BENJAMIN R. PADGETT, *Acting Primary Examiner.*

CARL D. QUARFORTH, REUBEN EPSTEIN,
*Examiners.*